(No Model.)
C. E. HIESTER.
HAMMOCK.
No. 278,431. Patented May 29, 1883.
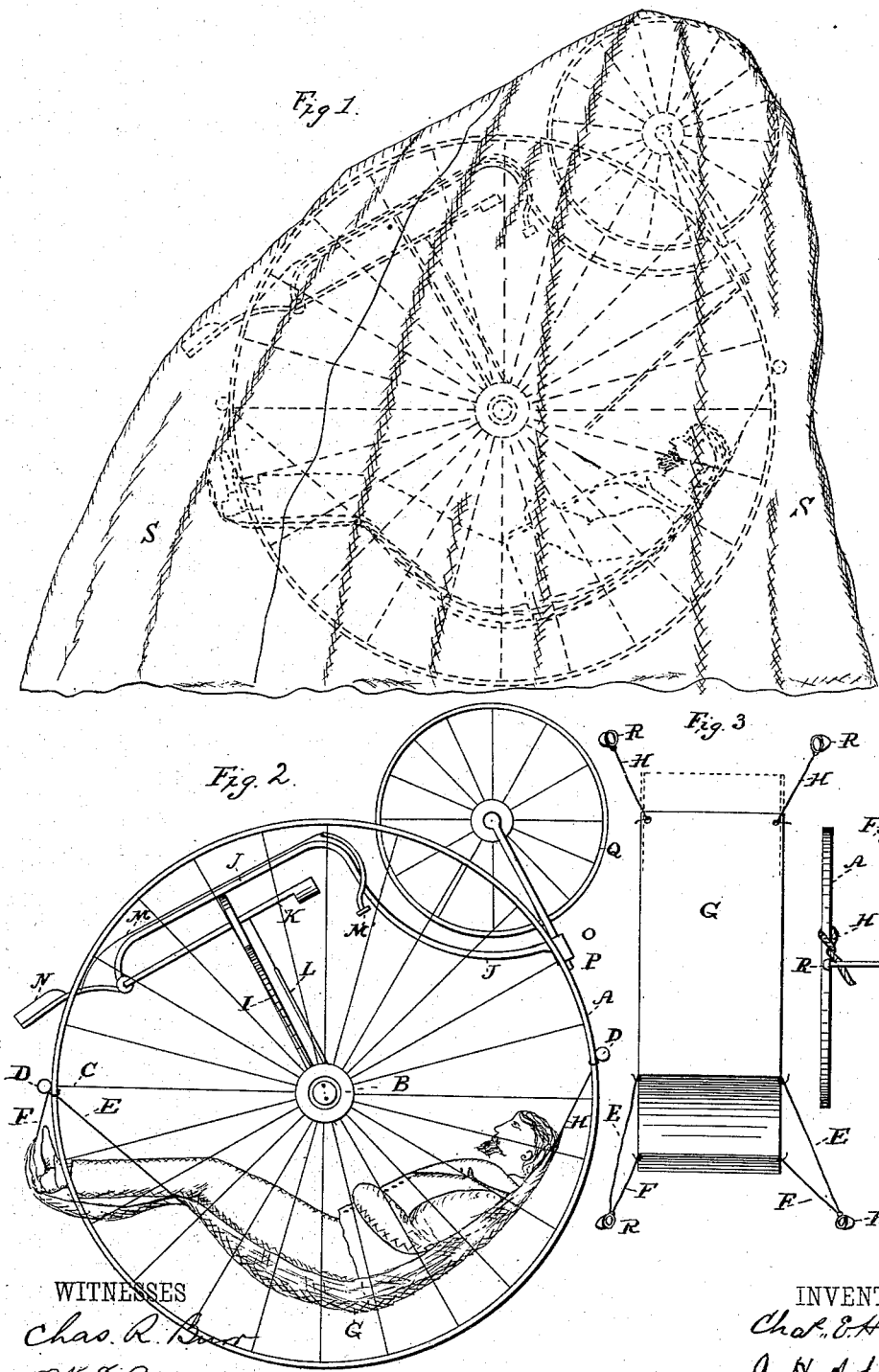
WITNESSES
Chas. R. ———
W. E. Bowen.
INVENTOR
Chas. E. Hiester
J. H. Adriaans
ATTORNEY

UNITED STATES PATENT OFFICE.

CHARLES E. HIESTER, OF HARRISBURG, PENNSYLVANIA.

HAMMOCK.

SPECIFICATION forming part of Letters Patent No. 278,431, dated May 29, 1883.

Application filed January 6, 1883. (No model.)

*To all whom it may concern:*

Be it known that I, CHARLES E. HIESTER, of Harrisburg, in the county of Dauphin and State of Pennsylvania, have invented certain new and useful Improvements in Hammocks; and I do hereby declare that the following is a full, clear, and exact description thereof, reference being had to the accompanying drawings, and to the letters of reference marked thereon, which form part of this specification.

My invention relates to an improvement in hammocks which, by reason of said improvement, are capable of suspension from a tricycle or other vehicle; and the objects of my improvement are, first, to provide a hammock capable of holding a person within a space less than the length of said person; second, to suspend such a hammock from the wheels of vehicles, permitting tourists to convert their vehicle into a sleeping-apartment at night, or afford an opportunity for a position of ease when fatigued; and, third, to accomplish these ends with the maximum simplicity of construction. I attain these objects by the means shown in the accompanying drawings, in which—

Figure 1 represents a side elevation of an inverted tricycle converted into a sleeping-apartment, with my hammock in place, the whole being covered by a suitable covering, the upper portion of which may be waterproof. Fig. 2 is a view similar to Fig. 1, with the covering removed, showing the inverted tricycle with my hammock suspended therefrom. Fig. 3 is a plan view of my improved hammock. Fig. 4 illustrates the method of affixing my hammock to the wheels of a vehicle.

Similar letters refer to corresponding parts throughout the several views.

For the purpose of illustration I have shown my improved hammock affixed to a tricycle patented to me January 30, 1883, No. 271,583; but it is obvious that its use is not so limited, and that it is capable of suspension from any two wheels mounted on the same axle, or from a tricycle, as shown in the drawings, or from the two axles or opposing spokes of a four-wheeled vehicle.

A represents a wheel mounted on an axle, B, whose other end is held in position by the counterpart of said wheel. The wheel is provided with suitable spokes, C.

When it is desired to affix the hammock, any cord, as H, is wound one turn around the rim and then a half-turn around itself. The tendency of such fastening is to draw the wheels together, and this is entirely obviated by a light rod, D, whose opposite ends are inserted in flexible or other sockets R, attached to the said cords. It will be understood that the more the tendency of the wheels to come together the more does the rod act to counteract said tendency and exactly neutralize it. Moreover, as the duty required of the rod D is in a longitudinal direction, along which line it has the maximum strength, it will be seen that an ordinary stick or the joint of a fishing-rod will suffice for all practical purposes.

G represents my hammock, having two cords E E, two cords F F, and two cords H H. The cords E E and F F join at the same socket, and are fastened at the same place. The purpose of the cords E E is to shorten the hammock in the direction of its length, taking advantage of the joint at the knee, thereby practically placing a six-foot man in a four-foot space, or, in other words, accommodating the man to the diameter of the wheel. It will be observed that a desirable position for rest is afforded by the hammock, which is entirely due to the relative position of the cords E E.

I represents the frame supporting the main frame J of the machine. Pedals K K are attached to this frame, operating flexible connections L L, which work suitable driving-disks.

M is a connecting-bar, operated by pedal M', and operating a pivoted brake, N. A bifurcated steering-lever, P, having a swivel-joint in the socket O, is operated by a handle convenient to the seat, and holds at the lower end an axle on which the wheel Q revolves.

S is a covering, whose upper portion may be water-proof, affording protection from the elements above, while the hammock is sufficiently high from the ground to be secure against the effect of unpleasant conditions beneath.

Should it be desirable to extend any portion of the hammock without increasing the space required for suspension, light bars may be affixed, carrying an additional piece of canvas, as shown in dotted lines, Fig. 3.

Having thus fully described my invention, what I claim, and desire to secure by Letters Patent of the United States, is—

1. A hammock having two cords at one end and four cords at the other end, two of the latter cords being located at a distance from that end equal to one-fourth the entire length of said hammock, substantially as set forth.

2. The method of suspending a hammock from the wheels of a vehicle, which consists in passing the cords around the rims at suitable points and holding the loose ends in position by devices independent of and supplemental to the rims, substantially as set forth.

3. A hammock having two cords at each end, and two additional cords at a distance from one end equal to one-fourth the entire length of said hammock, adapted to be suspended from the wheels of a vehicle, substantially as specified.

4. A hammock having two cords at each end, and two additional cords at a distance from one end equal to one-fourth the entire length of said hammock, in combination with rods or spreaders for counteracting the inward pressure of the wheels of a vehicle from which it is adapted to be suspended, substantially as specified.

5. A hammock, G, having two cords, H H, at one end, and four cords, E E F F, at the other end, the cords E E being located at a distance from that end equal to one-fourth the entire length of said hammock, substantially as set forth.

6. A hammock, G, having two cords, H H F F, at each end, and two additional cords, E E, at a distance from one end equal to one-fourth the entire length of said hammock, in combination with sockets R R, attached to the cords, and rods or spreaders D D, for counteracting the inward pressure of the wheels A A of a vehicle from which the hammock is adapted to be suspended, substantially as specified.

In testimony that I claim the foregoing as my own I affix my signature in presence of two witnesses.

CHARLES E. HIESTER.

Witnesses:
J. H. ADRIAANS,
T. O. PULIZZI.